United States Patent
Yen (10) Patent No.: US 9,621,339 B1
(45) Date of Patent: Apr. 11, 2017

(54) HOST DEVICES AND DATA TRANSMISSION METHODS

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/190,940

(22) Filed: Jun. 23, 2016

(30) Foreign Application Priority Data

May 11, 2016 (TW) .............................. 105114512 A (51) Int. Cl.
| | |
|---|---|
| *H04L 7/04* | (2006.01) |
| *H04L 12/40* | (2006.01) |
| *H04L 1/20* | (2006.01) |
| *G06F 13/00* | (2006.01) |
| *G06F 13/40* | (2006.01) |
| *G06F 13/42* | (2006.01) |

(52) U.S. Cl.
CPC .............. *H04L 7/048* (2013.01); *H04L 1/205* (2013.01); *H04L 12/40019* (2013.01); *G06F 13/00* (2013.01); *G06F 13/40* (2013.01); *G06F 13/4068* (2013.01); *G06F 13/42* (2013.01); *G06F 13/4282* (2013.01); *G06F 13/4291* (2013.01)

(58) Field of Classification Search
CPC ............. G06F 13/4291; G06F 13/4282; G06F 13/4068; G06F 13/00; G06F 13/40; G06F 13/42
USPC ................................ 375/362; 710/110, 305
See application file for complete search history.

(56) References Cited

U.S. PATENT DOCUMENTS

| | | | | |
|---|---|---|---|---|
| 5,864,653 | A * | 1/1999 | Tavallaei | G06F 11/0745 710/110 |
| 7,653,757 | B1 * | 1/2010 | Fernald | G06F 1/26 323/222 |
| 2004/0022204 | A1 * | 2/2004 | Trembley | H04L 1/22 370/285 |

(Continued)

FOREIGN PATENT DOCUMENTS

| | | |
|---|---|---|
| TW | 200712872 A | 4/2007 |
| TW | 201606511 A | 2/2016 |

OTHER PUBLICATIONS

Chinese language office action dated Dec. 27, 2016, issued in application No. TW 105114512.

*Primary Examiner* — Leila Malek
(74) *Attorney, Agent, or Firm* — McClure, Qualey & Rodack, LLP (57) ABSTRACT

A host device, coupled to a slave device through a bus interface, includes a frequency detector, a jitter detector, and a signal processing circuit. The frequency detector receives a first work frequency, and determines whether the first work frequency is the same as a second work frequency of the slave device. The jitter detector receives a first clock signal, and determines whether a jitter difference corresponding to the first clock signal exceeds a predetermined range. The signal processing unit includes a clock signal input pin, a data input pin, and an output pin. When the first work frequency is the same as the second work frequency, and the jitter difference is within the predetermined range, the signal processing circuit outputs a data signal to the slave device according to the first clock signal, data and Seems System Management Bus protocol.

10 Claims, 6 Drawing Sheets

(56) References Cited

U.S. PATENT DOCUMENTS

2012/0239841 A1* 9/2012 Trifonov ............. G06F 13/4282
  710/110
2016/0019183 A1 1/2016 Thurston et al.
2016/0170930 A1* 6/2016 Weng .................. G06F 13/4282
  710/110

* cited by examiner

HOST DEVICES AND DATA TRANSMISSION METHODS

CROSS REFERENCE TO RELATED APPLICATIONS

This Application claims priority of Taiwan Patent Application No. 105114512, filed on May 11, 2016, the entirety of which is incorporated by reference herein.

BACKGROUND OF THE INVENTION

Field of the Invention

The application relates in general to a host device and a data transmission method, and in particular to a host device and a data transmission method that use a bus interface having only one pin for communication.

Description of the Related Art

In the field of the related arts, when a host device and a slave device of an electric device or a system want to communicate or transmit data to each other, the communication often proceeds by using the System Management Bus (SMBus), Inter-Integrated Circuit (I2C), or HDQ protocol. However, because the protocols listed above often use a bus interface having two legs and the work frequency of each protocol are not the same, they cannot be easily managed and it is hard to find errors in the transmission signal. Moreover, a certain volume of the integrated circuit will be occupied by two of the pin legs. Thus, how to quickly detect errors that occur in the transmission signal and decrease the number of pin legs of the bus interface is a problem which needs to be solved immediately.

BRIEF SUMMARY OF INVENTION

An embodiment of the present invention provides a host device, coupled to a slave device through a bus interface, including a frequency detector, a jitter detector, and a signal processing circuit. The frequency detector receives a first work frequency, and determines whether the first work frequency is the same as a second work frequency of the slave device. The jitter detector receives a first clock signal, and determines whether a jitter difference corresponding to the first clock signal exceeds a predetermined range. The signal processing unit includes a clock signal input pin that receives the first clock signal, a data input pin that receives data, and an output pin that outputs a data signal. When the first work frequency is the same as the second work frequency, and the jitter difference is within the predetermined range, the signal processing circuit outputs data signal to the slave device through the bus interface according to the first clock signal, the data and Seems System Management Bus protocol. The bus interface has only one communication pin.

Another embodiment of the present invention provides a data transmission method, wherein the steps include: using a frequency detector of a host device to receive a first work frequency corresponding to the host device; using a jitter detector of the host device to receive a first clock signal corresponding to the first work frequency; determining whether the first work frequency is the same as a second work frequency of a slave device; and determining whether a jitter difference corresponding to the first clock signal exceeds a predetermined range. When the first work frequency is the same as the second work frequency and the jitter difference is within the predetermined range, a signal processing circuit of the host device outputs a data signal to the slave device through a bus interface according to the first clock signal, data and Seems System Management Bus protocol. The signal processing circuit comprises a clock signal input pin that receives the first clock signal, a data input pin that receives the data and an output pin that outputs the data signal. The bus interface has only one communication pin.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present devices and methods can be applied will become apparent from the detailed description provided herein. It should be understood that the detailed description and specific examples, while indicating exemplary embodiments of a host device and a data transmission method, are intended for purposes of illustration only and are not intended to limit the scope of the invention.

Figure 1:
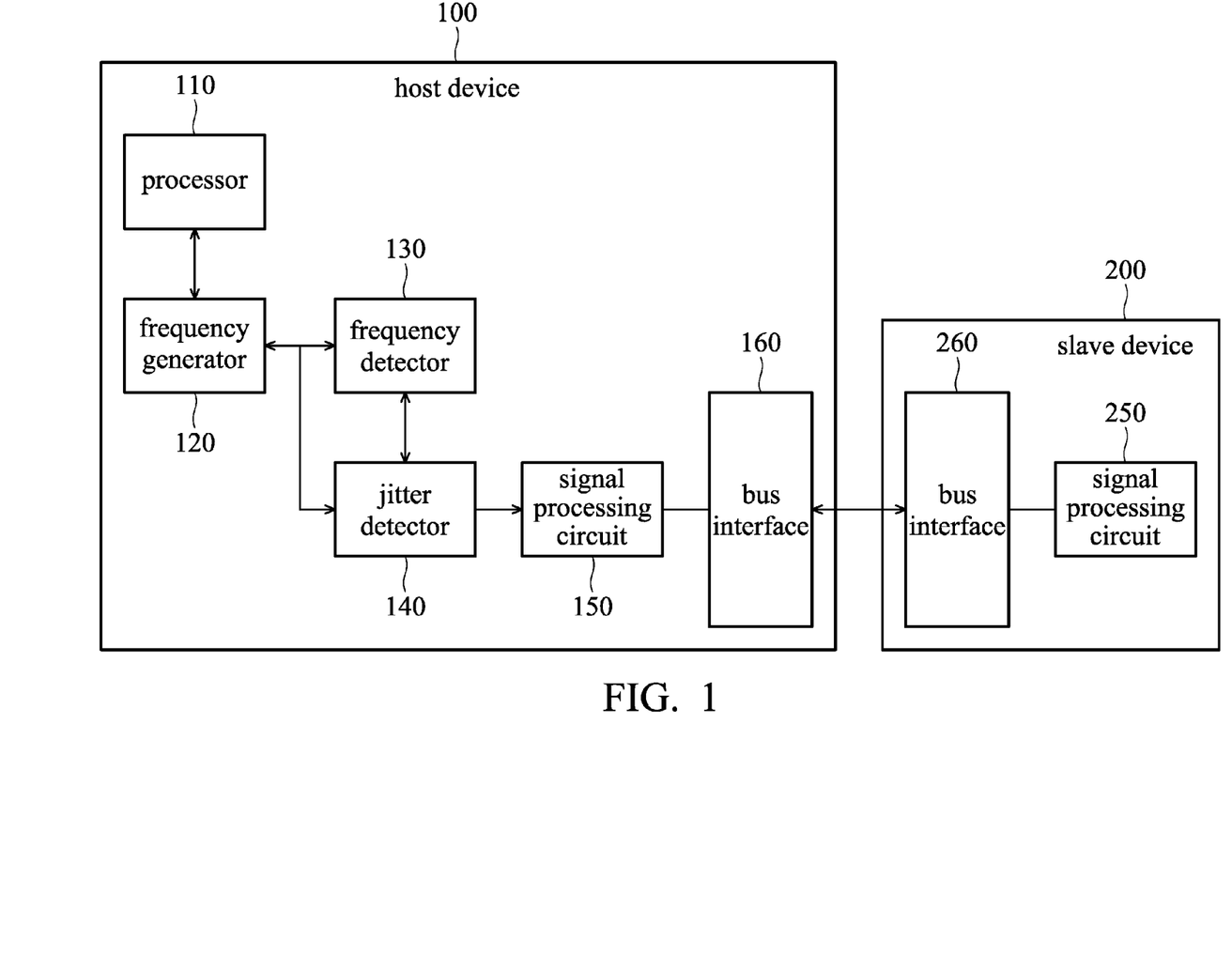
FIG. 1 is a block diagram of the host device in accordance with an embodiment of the invention.

FIG. 1 is a block diagram of the host device in accordance with an embodiment of the invention. As shown in FIG. 1, the host device 100 includes at least a processor 110, a frequency generator 120, a frequency detector 130, a jitter detector 140, a signal processing circuit 150, and a bus interface 160. The slave device 200 includes at least a signal processing circuit 250 and a bus interface 260. The host device 100 is coupled to the slave device 200 through the bus interface 160 and the bus interface 260. The processor 100 can be a CPU or a microprocessor having a first work frequency, and is configured to provide the transmission data or receive the data signal from the slave device, and execute the process corresponding to the data signal. The frequency generator 120 outputs the first clock signal according to the first work frequency of the processor 100. The frequency detector 130 detects whether the first work frequency is the same as a second frequency. The jitter detector 140 detects whether a jitter difference of the first clock signal and an ideal clock is within a predetermined range. The signal processing circuit 150 and the signal processing circuit 250 respectively receive the output data of the host device 100 and the slave device 200, receive the first clock signal and a second clock signal corresponding to the slave device 200, and generate the data signal. Both the bus interface 160 and the bus interface 260 have only one pin, and are used to proceed with two-way communication between the host device 100 and the slave device 200.

According to an embodiment of the present invention, for avoiding the excessive noise that is caused by the inconsistent work frequencies or the jitter of the clock which results in incorrect signal transmission when the host device 100 communicates with the slave device, the host device 100 first detects whether the host device 100 matches the slave device when the host device 100 connects to the slave device 200. For example, when the bus interface 160 connects to the bus interface 260, the slave device 200 first outputs the second work frequency to the frequency detector 130 of the host device 100. The frequency detector 130 then determines whether the first work frequency corresponding to the host device 100 is the same as the second work frequency corresponding to the slave device 200. The determination procedure performed by the frequency detector 130 can be performed repeatedly to avoid misjudgments. The frequency detector notices the jitter detector 140 to perform the determination of the next stage when the first work frequency is the same as the second work frequency. Otherwise, the frequency detector 130 outputs a warning signal to the processor 110 for stopping the subsequent procedures when the first work frequency is different than the second work frequency.

Figure 2A:
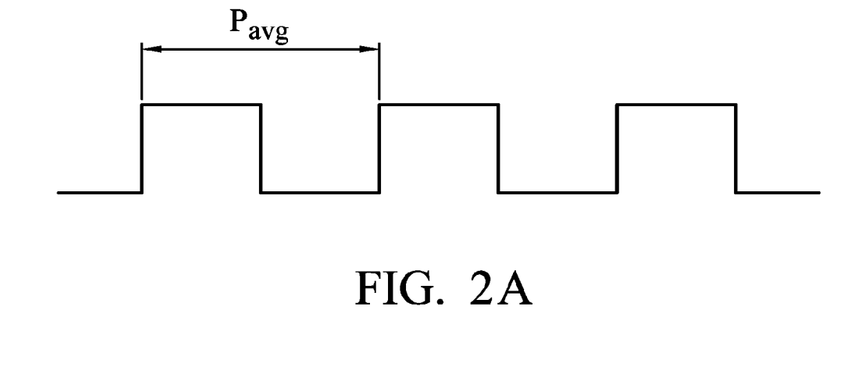
FIG. 2A is a schematic diagram of an ideal clock in accordance with an embodiment of the invention.
Figure 2B:
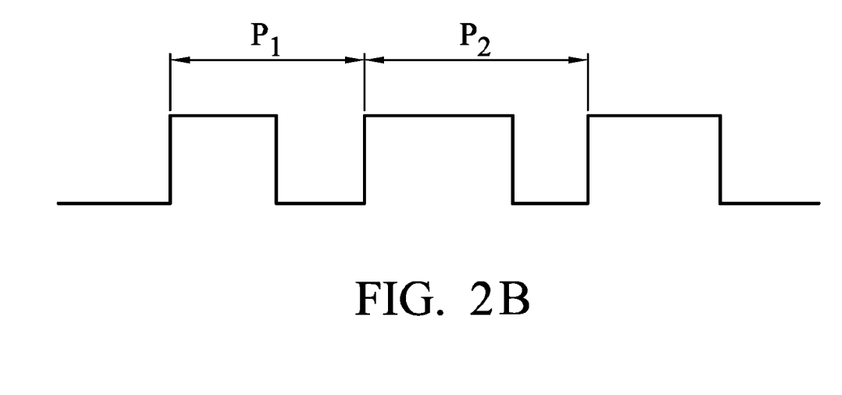
FIG. 2B is a schematic diagram of a real clock in accordance with an embodiment of the invention.

When the frequency detector 130 determines that the first work frequency is the same as the second work frequency, the jitter detector 140 detects the jitter of the first clock signal. The jitter indicates the presence of a phenomenon wherein the edges of each clock in the clock signal have deviated from the correct location. FIGS. 2A and 2B are schematic diagrams of an ideal clock and a real clock in accordance with an embodiment of the invention. According to an embodiment of the present invention, the jitter detector 140 determines whether to continue the procedures of the next stage by comparing the ideal clock and the real clock. For example, when the jitter detector 140 receives the first clock signal, the jitter detector 140 calculates the jitter difference of each cycle time and the ideal clock in the first clock signal (i.e. $P_{J1}=P_1-P_{avg}$, $P_{J2}=P_2-P_{avg}$), and accumulates the respective maximum values and the minimum values. When the maximum values and the minimum values are greater than a predetermined percentage of the ideal clock, such as a difference greater than 10% of the ideal clock, the jitter detector 140 determines that the jitter of the clock signal might result in incorrect signal transmission, and then outputs the warning signal back to the processor 110 to stop the subsequent procedures.

Figure 3:
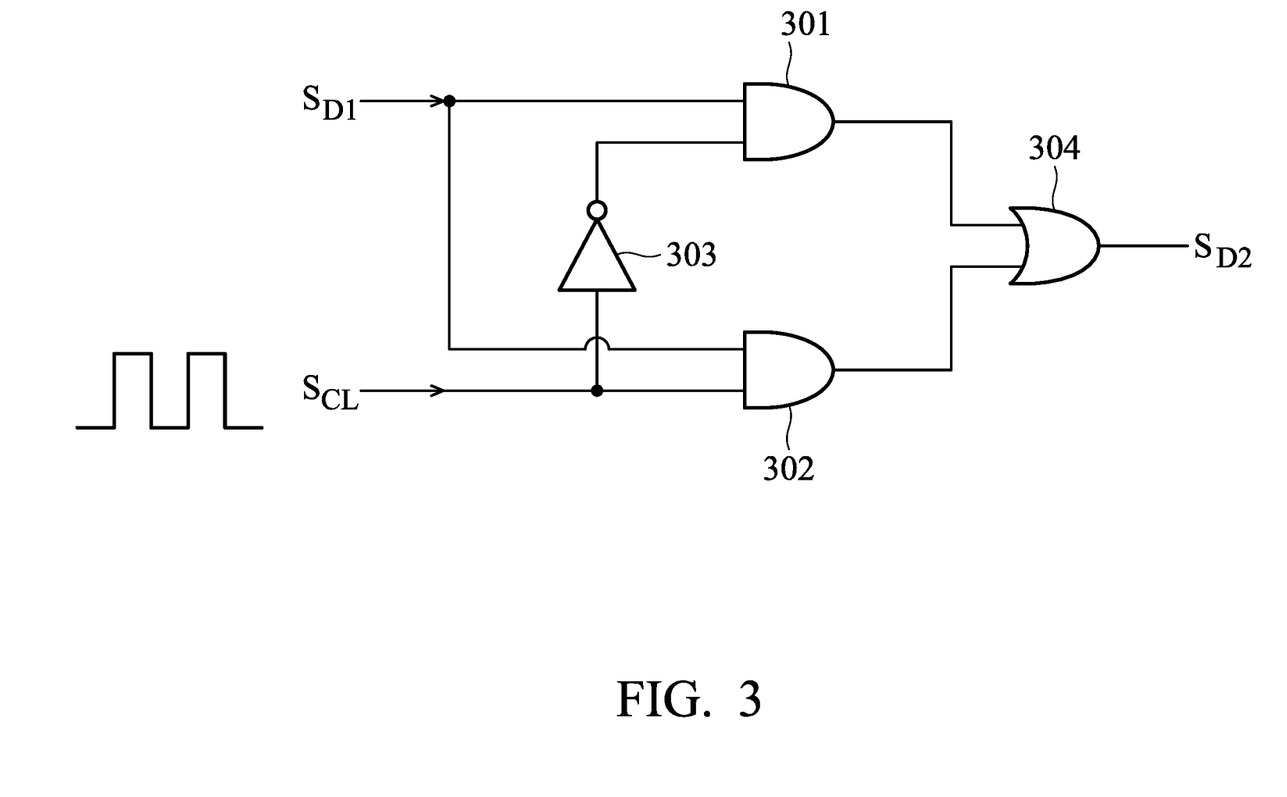
FIG. 3 is a circuit diagram of the signal processing circuit in accordance with an embodiment of the invention.

When the frequency detector 130 determines that the first work frequency corresponding to the host device 100 is the same as the second work frequency corresponding to the slave device 200 and the jitter detector 140 determines that the jitter difference of the first clock signal is less than 10%, the processor 110 determines that the host device 100 matches the slave device 200, and then starts to output data or instructions. In the related art, when the bus interface always uses two pins, i.e. the clock signal input pin and the data input pin, for transmitting the signal, and when the receiving end receives the signal, a decoding unit is used to decode the signal. However, in an embodiment of the present invention, before the output end outputs the clock signal and the data, the signal processing circuit 150 processes the clock signal and the data first for converting the clock signal and the data into a single output signal. For example, as shown in FIG. 3, which is a circuit diagram of the signal processing circuit in accordance with an embodiment of the invention, the signal processing circuit 150 is composed of a first AND-gate 301, a second AND-gate 302, a NOT-gate 303 and an OR-gate 304. The data $S_{D1}$ is input to first input ends of the first AND-gate 301 and the second AND-gate 302. The clock signal $S_{CL}$ is input to a second input end of the first AND-gate 301 through the NOT-gate 303, and is directly input to a second input end of the second AND-gate 302. The output ends of the first AND-gate 301 and the second AND-gate 302 are coupled to a first input end and a second input end of the OR-gate 304 respectively, and an output end of the OR-gate outputs a single data signal $S_{D2}$. By using the signal processing circuit 150, the clock signal and the data can be converted into a single output signal before transmitting to the receiving end, thus the number of pins can be reduced, and the receiving end can execute the instructions according to the signal immediately after receiving the signal without decoding the signal. Table 1 shows the added value statement corresponding to the signal processing circuit 150.

TABLE 1

| $S_{D1}$ | $S_{CL}$ | $S_{D2}$ |
|---|---|---|
| 0 | 0 | 0 |
| 0 | 1 | 0 |
| 1 | 0 | 1 |
| 1 | 1 | 1 |

It should be noted that, because the data might be output from the slave device 200 to the host device 100 when the host device 100 communicates with the slave device 200, the slave device 200 also includes a signal processing circuit 250 to make the types of data signal consistent. The structure of the signal processing circuit 250 is the same as the structure of the signal processing circuit 150, and thus it is not described herein.

After the OR-gate 304 outputs the data signal $S_{D2}$, the host device 100 outputs the data signal $S_{D2}$ to the slave device 200 through the bus interface 160 according to the Seems System Management Bus Protocol. The working frequency of the Seems System Management Bus Protocol is set between 10 KHz-100 KHz.

FIGS. 4A-4D are schematic diagrams of a sending process, a receiving process, a writing process and a reading process in accordance with some embodiments of the invention. As shown in the figures, the signals of the Seems System Management Bus Protocol includes a start condition (shown as "s"), a slave address of the transmitted data (shown as "Slave Address"), a write instruction (shown as "Wr"), a read instruction (shown as "Rd"), an acknowledge signal (shown as "A"), a command code (shown as "Command Code"), a data package (shown as "Data Byte"), a packet error code (shown as "PEC") and a stop condition (shown as "P").

Figure 4A:
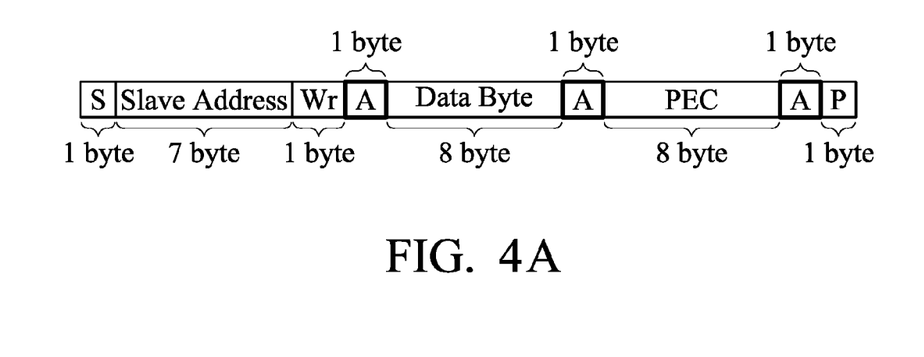
FIG. 4A is a schematic diagram of a complete sending process in accordance with an embodiment of the invention.
Figure 4B:
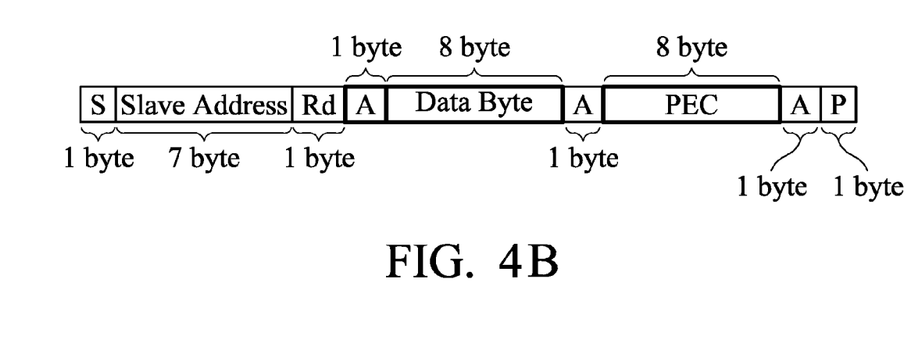
FIG. 4B is a schematic diagram of a complete receiving process in accordance with an embodiment of the invention.

FIGS. 4A, 4B are schematic diagrams of the complete sending process and the complete receiving process in accordance with some embodiments of the invention. As shown in FIG. 4A, the output end outputs the sending signal to the receiving end according to the following sequence: outputting 1 bit of the start condition→outputting 7 bits of the slave address→outputting 1 bit of the write control code→receiving 1 bit of the acknowledge signal→outputting 8 bits of the data package→receiving 1 bit of the acknowledge signal→outputting 8 bits of the packet error code→receiving 1 bit of the acknowledge signal→outputting 1 bit of the stop condition. After the output end outputs the acknowledge signal, the receiving end will set the signal from the high level to the low level to represent that the data package has been successfully received. Otherwise, when the receiving end does not set the signal from the high level to the low level, it means that the receiving end has failed to receive the data package, and then the output end outputs the stop condition for stopping the sending process.

After the output end completes the sending process, the receiving end starts to execute the receiving process. As shown in FIG. 4B, the output sequence of the signal is: outputting 1 bit of the start condition→outputting 7 bits of the slave address→outputting 1 bit of the read control code→receiving 1 bit of the acknowledge signal→receiving 8 bits of the data packet→outputting 1 bit of the acknowledge signal→receiving 8 bits of the packet error code→outputting 1 bit of the acknowledge signal→outputting 1 bit of the stop condition.

Figure 4C:
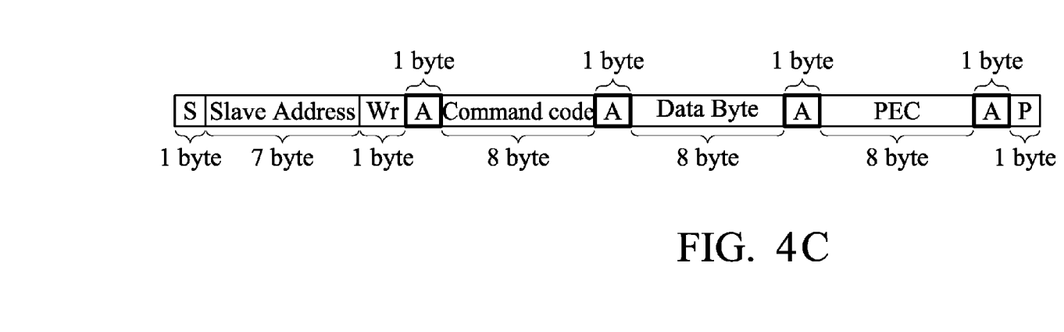
FIG. 4C is a schematic diagram of a complete writing process in accordance with an embodiment of the invention.

According to another embodiment of the present invention, FIG. 4C is a schematic diagram of a complete writing process in accordance with an embodiment of the invention. The output end executes the writing process according to the following sequence: outputting 1 bit of the start condition→outputting 7 bits of the slave address→outputting 1 bit of the write control code→receiving 1 bit of the acknowledge signal→outputting 8 bits of the command code→receiving 1 bit of the acknowledge signal→outputting 8 bits of the data package→receiving 1 bit of the acknowledge signal→outputting 8 bits of the packet error code→receiving 1 bit of the acknowledge signal→outputting 1 bit of the stop condition.

Figure 4D:
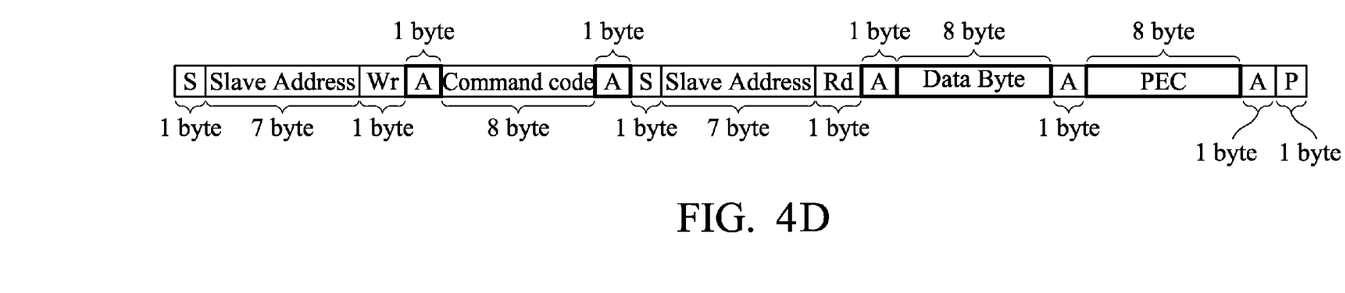
FIG. 4D is a schematic diagram of a complete reading process in accordance with an embodiment of the invention.

According to another embodiment of the present invention, FIG. 4D is a schematic diagram of a complete reading process in accordance with an embodiment of the invention. The output end executes the reading process according to the following sequence: outputting 1 bit of the start condition→outputting 7 bits of the slave address→outputting 1 bit of the write control code→receiving 1 bit of the acknowledge signal→outputting 8 bits of the command code→receiving 1 bit of the acknowledge signal→outputting 1 bit of the start condition again→outputting 7 bits of the slave address→outputting 1 bit of the read control code→receiving 1 bit of the acknowledge signal→receiving 8 bits of the data package→outputting 1 bit of the acknowledge signal→receiving 8 bits of the packet error code→outputting 1 bit of the acknowledge signal→outputting 1 bit of the stop condition.

It should be noted that in the receiving process, the writing process and the reading process described above, when the level of the acknowledge signal is not set from the high level to the low level, both the receiving end and the output end will stop the process, and then check the signal or send the signal again.

Figure 5:
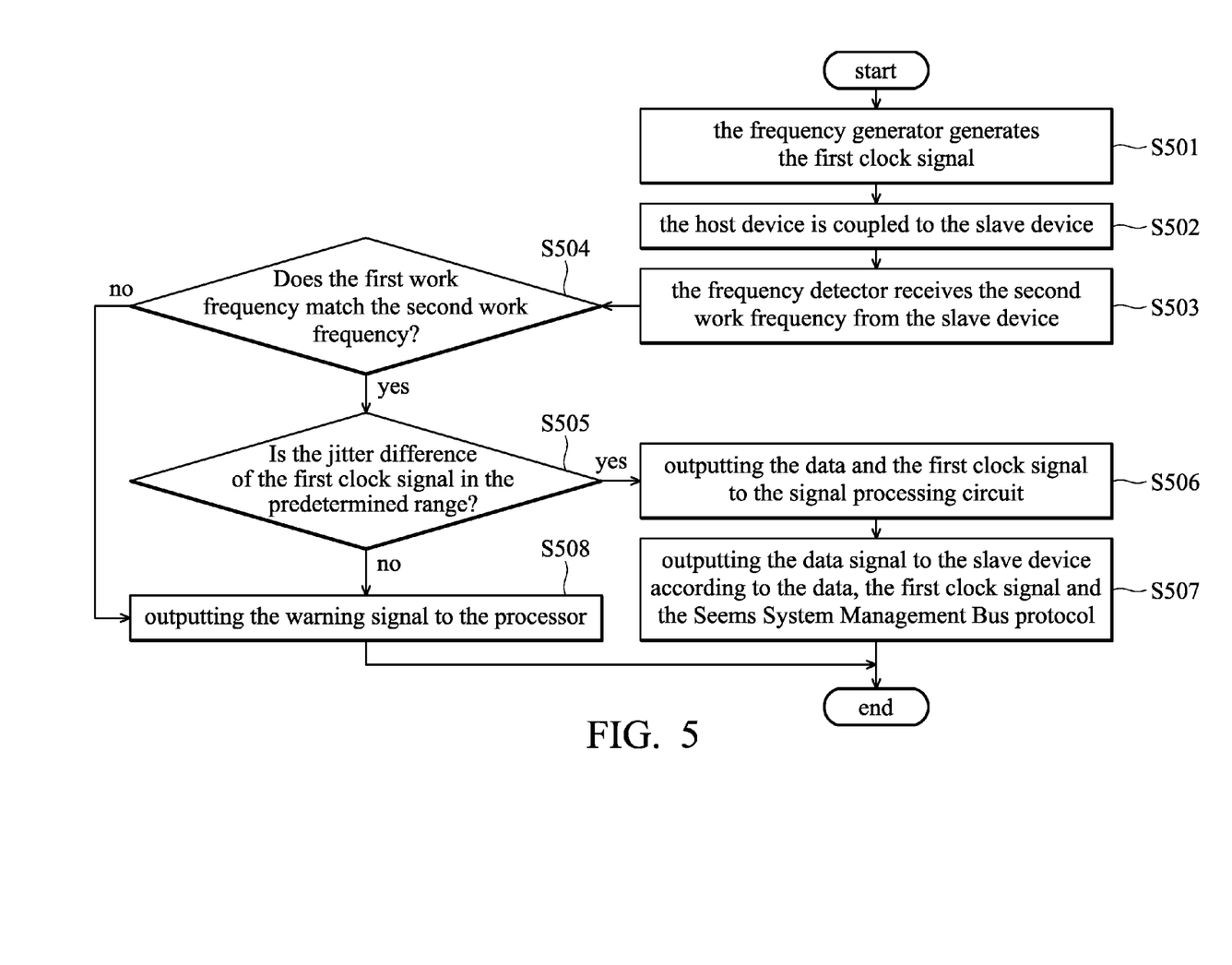
FIG. 5 is a flow chart of the data transmission method in accordance with an embodiment of the invention.

Please refer to FIG. 5, which is a flow chart of the data transmission method in accordance with an embodiment of the invention. In step S501, the frequency generator 120 of the host device 100 generates the first clock signal according to the first work frequency corresponding to the processor 110. In step S502, the host device 100 is coupled to the slave device 200 through the bus interface 160. In step S503, the frequency detector 130 of the host device receives the second work frequency corresponding to the slave device 200 from the slave device 200. In step S504, the frequency detector 130 determines whether the first work frequency corresponding to the host device 100 matches the second work frequency corresponding to the slave device 200. If the first work frequency is the same as the second work frequency, the method proceeds to step S505, and the jitter detector 140 of the host device 100 determines whether the jitter difference of the first clock signal is in the predetermined range. If the jitter difference is in the predetermined range, the method proceeds to step S506, the processor 110 outputs the data to the data input pin of the signal processing circuit 150, and the frequency generator 120 outputs the first clock signal to the clock signal input pin of the signal processing circuit 150. Otherwise, when the first work frequency is different from the second work frequency, or the jitter difference exceeds the predetermined range, the method proceeds to step S508, the frequency detector 130 or the jitter detector 140 outputs the warning signal to the processor 110 for stopping the subsequent procedures. In step S507, the signal processing circuit 150 outputs the data signal from the output pin according to the data, the first clock signal and the Seems System Management Bus protocol, and outputs the data signal to the slave device 200 through the bus interface 260.

As described above, according to the host device and the data transmission method of the present invention, when the work frequencies of the host device and the slave device are the same, the data and the clock signal can be decoded into a data signal by the signal processing circuit, and then the data signal can be transmitted according to the Seem System Management Bus protocol through the bus interface having only one pin. In this way, the communication can be implemented by only one pin, and the data signal can be easily controlled. Furthermore, it can be determined whether the work frequencies of the host device and the slave device and the jitter difference of the clocks conform to the conditions for communication before transmitting the data, thereby avoiding errors in the data transmission.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A host device, coupled to a slave device through a bus interface, comprising:
   a frequency detector, receiving a first work frequency, and determining whether the first work frequency is the same as a second work frequency of the slave device;
   a jitter detector, receiving a first clock signal, and determining whether a jitter difference corresponding to the first clock signal exceeds a predetermined range; and
   a signal processing unit, comprising a clock signal input pin that receives the first clock signal, a data input pin that receives data, and an output pin that outputs a data signal;
   wherein when the first work frequency is the same as the second work frequency and the jitter difference is within the predetermined range, the signal processing circuit outputs the data signal to the slave device through the bus interface according to the first clock signal, the data and Seems System Management Bus protocol, and the bus interface has only one communication pin.

2. The host device as claimed in claim 1, wherein the frequency detector outputs a warning signal when the first work frequency is different from the second work frequency, or the jitter detector outputs the warning signal when the jitter difference is outside the predetermined range, and the first clock signal and the data stop outputting to the signal processing circuit.

3. The host device as claimed in claim 1, wherein the signal processing circuit comprises a NOT-gate, a first AND-gate, a second AND-gate and an OR-gate.

4. The host device as claimed in claim 3, wherein:
the data is input to first input ends of the first AND-gate and the second AND-gate, and the first clock signal is input to an input end of the NOT-gate and a second input end of the second AND-gate; and
an output end of the NOT-gate is coupled to a second input end of the first AND-gate, output ends of the first AND-gate and the second AND-gate are coupled to a first input end and a second input end of the OR-gate respectively, and an output end of the OR-gate outputs the data signal.

5. The host device as claimed in claim 2, further comprising:
a processor, having the first work frequency, is configured to provide the data, and to stop the output of the data according to the warning signal; and
a frequency generator, generating the first clock signal according to the first work frequency, and stopping the output of the first clock signal according to the warning signal.

6. A data transmission method, comprising:
receiving, via a frequency detector of a host device, a first work frequency corresponding to the host device;
receiving, via a jitter detector of the host device, a first clock signal corresponding to the first work frequency;
determining whether the first work frequency is the same as a second work frequency of a slave device; and
determining whether a jitter difference corresponding to the first clock signal exceeds a predetermined range;
wherein when the first work frequency is the same as the second work frequency and the jitter difference is within the predetermined range, a signal processing circuit of the host device outputs a data signal to the slave device through a bus interface according to the first clock signal, data and Seems System Management Bus protocol;
wherein the signal processing circuit comprises a clock signal input pin that receives the first clock signal, a data input pin that receives the data and an output pin that outputs the data signal; and
wherein the bus interface has only one communication pin.

7. The data transmission method as claimed in claim 6, further comprising:
outputting a warning signal via the frequency detector when the first work frequency is different from the second work frequency; or
outputting the warning signal by the jitter detector when the jitter difference is outside the predetermined range; and
stopping the output of the first clock signal and the data to the signal processing circuit when receiving the warning signal.

8. The data transmission method as claimed in claim 6, wherein the signal processing circuit comprises a NOT-gate, a first AND-gate, a second AND-gate and an OR-gate.

9. The data transmission method as claimed in claim 8, further comprising:
inputting the data to first input ends of the first AND-gate and the second AND-gate; and
inputting the first clock signal to an input end of the NOT-gate and a second input end of the second AND-gate;
wherein an output end of the NOT-gate is coupled to a second input end of the first AND-gate, output ends of the first AND-gate and the second AND-gate are coupled to a first input end and a second input end of the OR-gate respectively, and an output end of the OR-gate outputs the data signal.

10. The data transmission method as claimed in claim 7, further comprising:
providing the data by a processor having the first work frequency;
stopping the output of the data according to the warning signal;
generating the first clock signal according to the first work frequency by a frequency generator; and
stopping the output of the first clock signal according to the warning signal.

* * * * *